United States Patent Office 3,381,316
Patented May 7, 1968

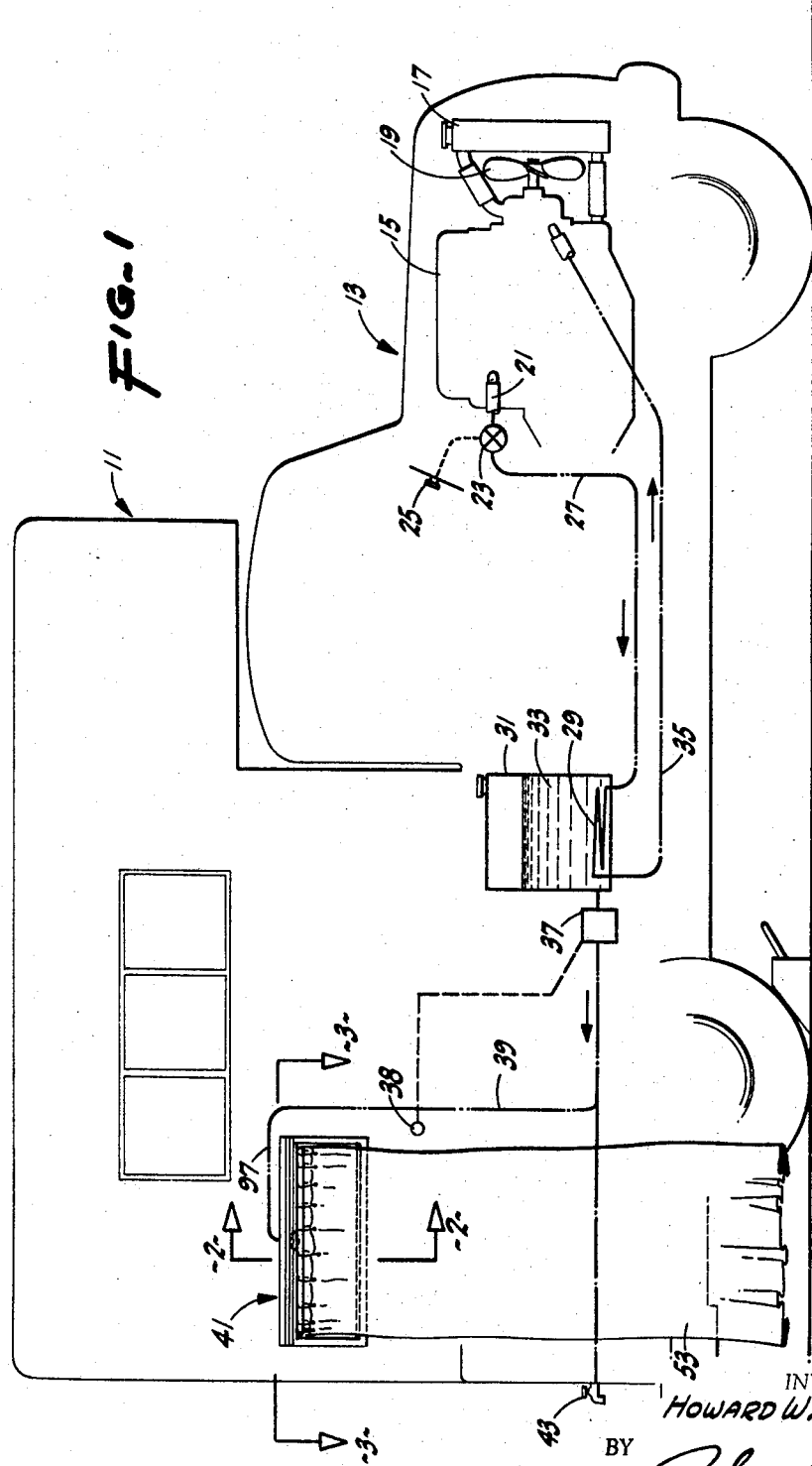

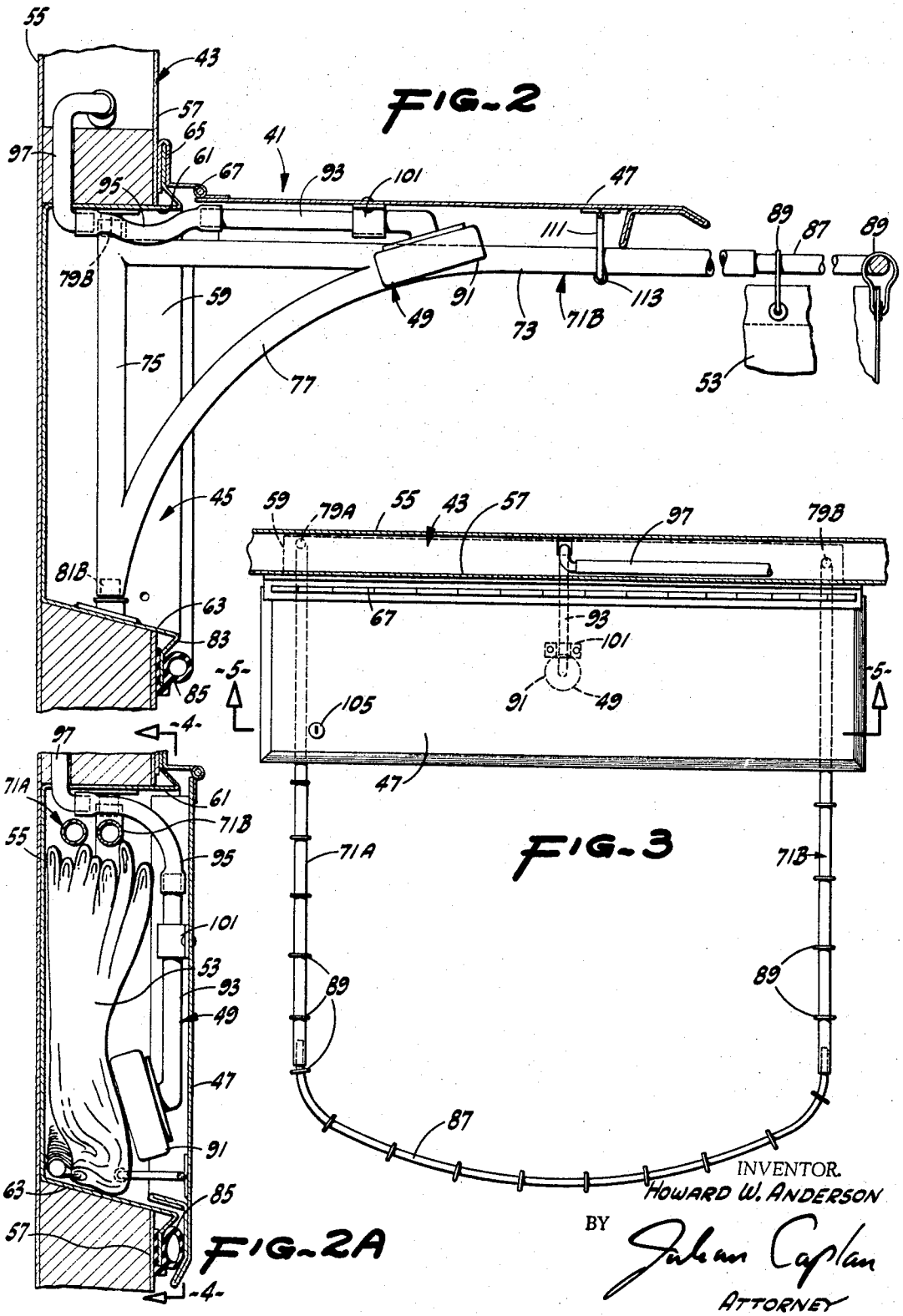

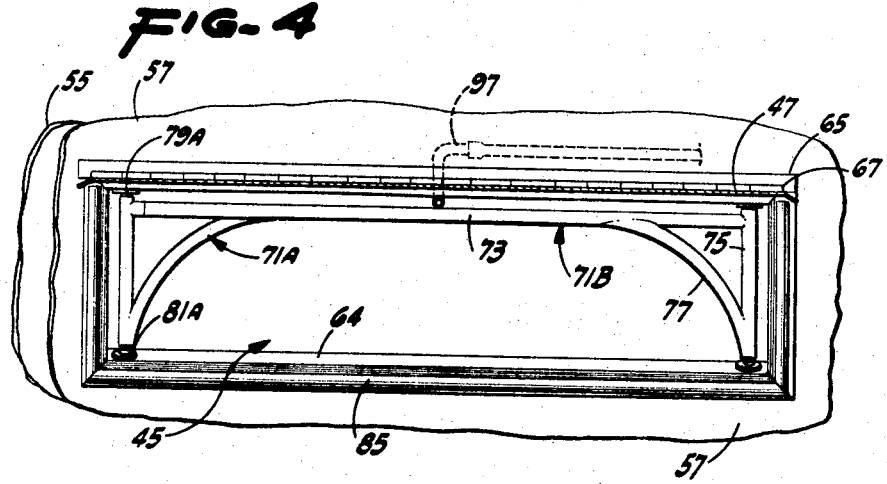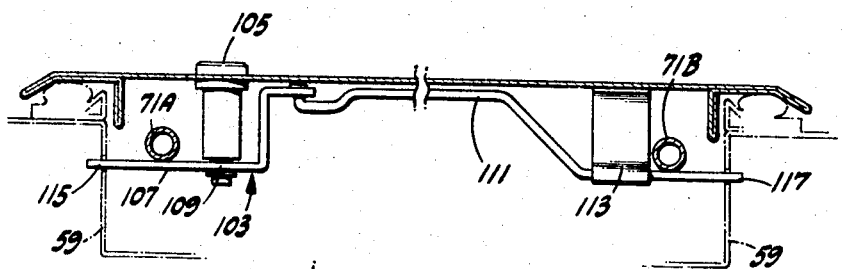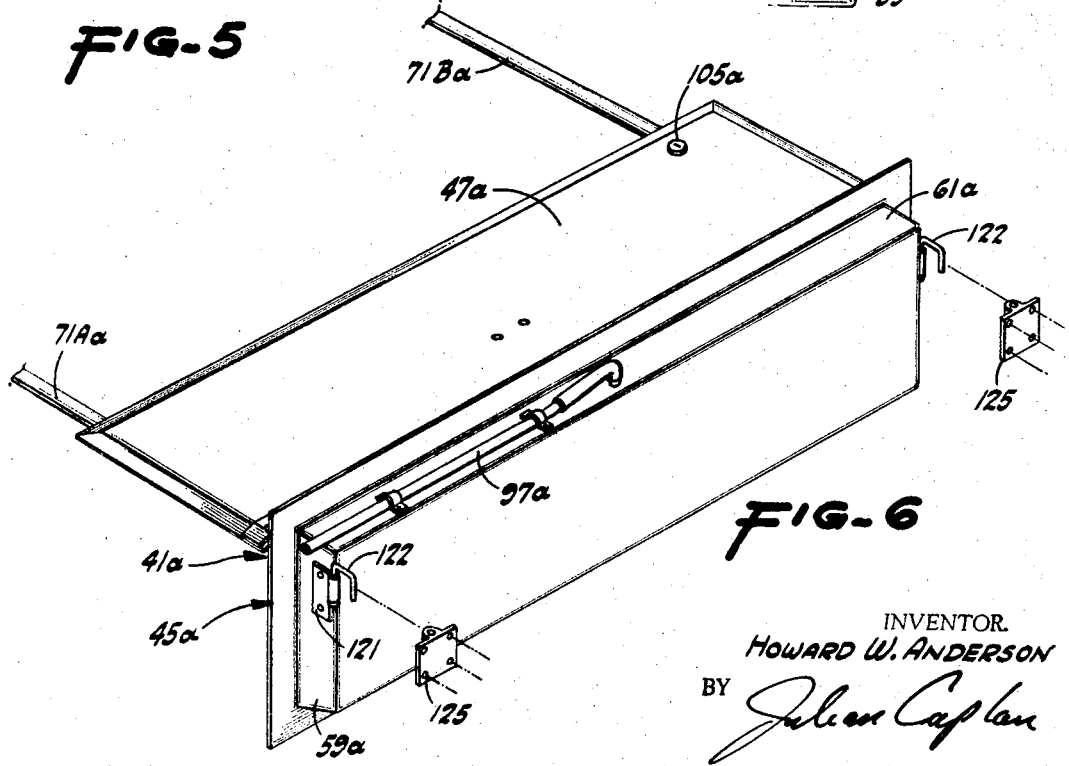

3,381,316
CAMPER SHOWER SYSTEM
Howard W. Anderson, P.O. Box 935,
Santa Cruz, Calif. 95060
Filed Aug. 23, 1965, Ser. No. 481,859
4 Claims. (Cl. 4—154)

ABSTRACT OF THE DISCLOSURE

A mobile camping unit is formed with a casing in one wall opening to the exterior and having a hinged cover. A shower nozzle, shower curtain and support means for the curtain capable of being folded inside the casing when not in use and the cover is closed and of being unfolded when the cover is opened are included. The engine for the camping unit vehicle heats water for the tank.

---

This invention relates to a new and improved mobile hot water heating system for use in conjunction with an automobile engine and a compact and portable shower unit for installation in or use with new or existing mobile campers and trailers.

The popularity of camping out-of-doors has created an increased demand for mobile campers and trailers and conveniences associated therewith. There has arisen a need for a means of supplying hot water when camping out-of-doors which does not involve an open flame or consume large quantities of electrical power. There also exists a need for a portable shower unit for use in isolated areas which can be used in conjunction with a mobile camper or trailer.

A primary feature of this invention is that heating of water is accomplished by utilizing and extending the capabilities of existing coolant water found in a watercooled automobile or truck engine. Heated water in the automobile coolant system is carried to a water tank in a convenient location on the vehicle or trailer and used to transfer heat to a separate water supply to be used for washing, shower-bathing, washing dishes, etc.

A further advantage of the present invention is the fact that a considerable quantity of water may be heated by this method within a short time while the automobile engine is running.

Another principal feature of this invention is the fact that a compact shower system is provided by a built-in unit fitting within the thickness of the trailer or camper wall and which may be extended outwardly from the wall to form a shower unit complete with curtain and nozzle.

A further advantage of this device is the fact that the shower unit may be constructed as a separate removable unit to be removably attached to the side wall of an existing camper or trailer rather than built into the wall at the time of initial construction or on modification. A still further advantage of the invention is the provision of a storage chamber within the shower unit which holds the nozzle, shower curtain and rod within the chamber.

A still further advantage of the invention is the provision of a shower nozzle which is automatically brought into proper position upon opening of the outer door to the shower storage chamber.

Further features of the invention are: The provision of a locking device on the outer door to the shower storage chamber; the provision for hinged shower rods within the storage chamber which rotate outwardly to form shower-rod supports; and the fact that a separate cold-water supply system may be used in conjunction with the hot water system to provide water of the desired temperature.

Other objects of the present invention will become apparent upon reading the following specifications and referring to the accompanying drawings in which similar characters of reference represent corresponding parts in each of the several views.

In the drawings:

FIG. 1 is a side, schematic view of a conventional truck camper with a hot water system and shower unit constructed in accordance with the present invention.

FIG. 2 is an enlarged, vertical sectional view taken substantially along the line 2—2 of FIG. 1, showing the shower unit in the open position.

FIG. 2A is an enlarged sectional view similar to that of FIG. 2, showing the shower unit in the closed stored position.

FIG. 3 is an enlarged horizontal sectional view taken substantially along line 3—3 of FIG. 1, showing the shower unit and curtain rod in open position.

FIG. 4 is a fragmentary sectional view taken substantially along the line 4—4 of FIG. 2A, showing the interior of the shower unit chamber.

FIG. 5 is a fragmentary sectional view taken substantially along the line 5—5 of FIG. 3, showing the locking mechanism.

FIG. 6 is a perspective view of a modification in which the shower unit is a separate and replaceable unit mounted on the side of an existing camper or trailer.

Camping out-of-doors enjoys widespread popularity and has created a need by owners of campers and trailers for conveniences such as hot water for washing, bathing, etc. and the provisions for some form of shower to be used in areas where such facilities are not at hand. The present invention provides a camper shower system which utilizes the heat of a water-cooled automobile engine to heat shower water, together with a compact and inexpensive shower unit either permanently installed in or conveniently attached to a camper or trailer.

Referring to FIG. 1, a conventional camper body 11 is shown attached to a standard pickup truck 13. Also shown is standard internal combustion engine 15 which utilizes water as a coolant, which is contained in radiator 17, mounted on the front of the vehicle and used with radiator fan 19. The conventional engine is modified as follows: Heated coolant water is taken off at the rear of the engine into line 21, which leads to on-off valve 23 which is controlled by actuating lever 25 on the dashboard of the automobile. This permits on and off actuation of the water-heating system by a person seated within the cab of the vehicle 13. Line 27 leads from valve 23 to the rear of the cab to heat transfer coil 29 mounted within water chamber 31 which contains a quantity of water 33 to be heated.

Heat transfer coil 29 may be of any conventional configuration, such as a concentric coil or a series of heat transfer coils in a ladder configuration, as is well-known in the art. Engine coolant water is returned by line 35 to the forward section of engine 15, to be circulated by means of the internal connections within the engine to radiator 17, to be cooled by air passing over radiator 17 by movement of the vehicle or by rotation of cooling fan 19. Thus the heat imparted to coolant water within the engine is passed through line 27 to be transferred to water 33 within chamber 31. Thus it is seen that heat produced by the engine 15 is put to a useful purpose rather than dissipated. In addition, it is to be noted that the coolant water loses a considerable amount of heat in heat transfer unit 29, thus providing a lower temperature of water within the automobile radiator 17 and creating a lower temperature level of coolant water within engine 15. Water tank 31 may be mounted in any convenient location, either within the truck or vehicle itself, or within the camper body 11 or on a trailer which is drawn by the vehicle. If water tank 31 is placed within a trailer drawn by the vehicle, a flexible coupling for use with lines 27 and 35 may be utilized as is well-known in the art.

Water 33 which has been heated within tank 31 passes into water-pump 37, which may be of a standard construction as used within automobiles and trucks and operated on the six-volt or twelve-volt battery system available within the vehicle itself. Pump 37 is actuated by switch 38 located at a convenient position. Pressurized water at the pressure-end of pump 37 passes into either line 39, proceeding to pipe 97 and shower unit 41 or proceeds to faucet 43 on the extreme rear end of the camper or trailer for uses other than shower bathing. Thus it is seen that the described water-heating system does not utilize an open flame as do present gas systems which present fire hazards in forest areas and, additionally, does not provide an undue drain on the electrical system of the automobile or require a separate electrical system, as do present electrically operated mobile water-heating systems. The present invention imposes no strain upon the operation of the engine beyond what would be expected with a normally installed air-heating system and, on the contrary, may increase the efficiency of the automobile engine by lowering the over-all temperature of coolant water as it passes back into the radiator.

Shower unit 41 is shown in detail in FIGS. 2 through 6. Shower unit 41 is entirely contained within the thickness of wall assembly 43 of camper body 11. Shower unit 41 is essentially composed of box-like casing 45 with a hinged lid or cover 47. As shown in FIG. 2A, casing 45 is of a size sufficient to completely hold shower nozzle assembly 49, shower rod assembly 51, and shower curtain 53. The main structural portions of shower unit 41 may be constructed of a non-rust metal, such as anodized aluminum, stainless steel, or the like. Shower unit casing 45 fits flush against inner-wall 55 of camper 11 and extends a slight distance beyond outer wall 57 of the camper. Casing 45 is composed of side walls 59, top wall 61, and bottom wall 63. Top wall 61 extends outwardly against outer wall 57 of camper 11 in the form of flange 65, which is attached to hinge 67 which allows cover 47 to pivot about and close casing 45. Pivotally mounted within container 45 are shower rods 71A and 71B, which are composed of horizontal members 73, vertical member 75, and arcuate supporting member 77. Supporting rod assemblies 71 are hollow and formed of metallic tubing. Vertical rod 75 fits over and rotates about upper pivots 79 and lower pivots 81, respectively mounted on upper wall 63 and lower wall 64 of container 45. Pivots 79 and 81 are staggered in position at each end of chamber 45, as shown in FIG. 3, to allow supporting rod assemblies 71 to turn and fit flat upon each other when stored within casing 45.

Lower wall 64 of casing 45 slopes downwardly, as shown in FIG. 2, to allow any water from any of the parts or curtain 53 to flow outwardly of the chamber to avoid rust or mildew. Lower wall 64 extends outwardly in the form of flange 83. Attached to flange 83 is rubber gasket 85 which extends around the periphery of casing 45 on three sides to seal the interior of the container when cover 47 is in the closed position, as shown in FIG. 2A.

Arcuate curtain rod 87 is a separate element adapted to be inserted in the open ends of shower support rods 71A and 71B. When the shower unit it to be collapsed and stored, rod 87 is removed and placed flat within casing 45. Shower curtain 53 is of a standard type with a plurality of extending rings 89 which support the curtain from support rods 71A, 71B and 87.

Nozzle assembly 49, composed of conventional nozzle head 91, is connected to metallic pipe 93, which is further connected by means of flexible platsic or rubber hose 95, to supply pipe 97 mounted within wall 43 on camper 11. Pipe 93 is attached to the inner surface of door-cover 47 by means of bracket 101. Pipe 93 slides within bracket 101 in such manner that upon closing of door 47, shower-head assembly 49 slides outwardly and downwardly to the position shown in FIG. 2A to allow flexible hose 95 to continually assume a position which does not exert undue stress or twisting strain upon it. Water supply pipe 97 is connected to a hot water supply system such as that previously described herein.

Latching assembly 103 comprises key-actuated locking device 105 which actuates lever 107, which in turn rotates about point 109 to actuate lock-rod 111, which is slidably held by bracket 113. As shown in FIG. 5, actuation of key-lock 105 extends pins 115 and 117 through holes provided in inner-walls 59 of casing 45, as shown by dotted lines in FIG. 5. In addition, locking mechanism 103 serves an additional purpose when cover 47 is in its open and extended position to prevent lid 47 from blowing upwards because of a sudden gust of wind, which would deflect nozzle 91. Locking mechanism 103 primarily serves to protect the shower unit from being opened when not desired and damaged by vandals or small children.

A modification is shown in FIG. 6, in which similar characters of reference are distinguished by the addition of the letter *a*. The modification shown in FIG. 6 is a form which permits the shower unit 41a to be attached to the side of a camper or trailer outer wall rather than inserted within the wall, thus avoiding the necessity of installing the unit upon assembly of the camper or trailer, or cutting a hole in the outer wall 57. Shower unit 41a is attached to the side of a camper by means of brackets 121 and U-shaped pins 122 which are attached to the outer surface of side walls 59a of casing 45a. U-shaped hooks 122 hook into receiving brackets 125, mounted on outer wall 57 of camper body 11. Thus this modification permits the unit 41a to be removably hooked onto brackets 125 on the outer wall of the camper and to present a projection of only approximately two to four inches onto outer wall 57 thus even permitting the unit to remain in place as the camper is driven around and not to violate existing motor vehicle codes. Water supply line 97a can be attached to an outlet on the exterior of the camper body at any desired point.

The system heretofore described is operated as follows: The driver in vehicle 13 operates actuating lever 25 and valve 23 to allow heated water from engine 15 to pass through heating coil 29 in water tank 31, thus heating water 33. When water 33 has reached a desired temperature, it may be used for any purpose desired by the camper. When the camper desires to take a shower, locking mechanism 103 is unlocked by inserting a key in device 105, thus retracting pins 115 and 117, allowing cover 47 to be lifted. As cover 47 is lifted to a horizontal position, as shown in FIG. 2, nozzel assembly 49 slides within bracket 101 until it assumes the position shown in FIG. 2, and is automatically in place for use. The user then rotates supporting bars 71b and 71a until they extend outwardly from wall 57 at right angles, as shown in FIG. 3. The user then extracts rod support section 87 from the interior of chamber 45 and inserts each end into the projecting ends of supporting bars 71a and 71b, as shown in FIG. 3. Shower curtain 53, already being compressed on bar 87, is then extended along the side support bars 71a and 71b. Cover 47 is then released to rest on the upper edges of bars 71a and 71b, and locking mechanism 103 is again extended to prevent cover 47 from being inadvertently lifted up, as shown in FIG. 5. The user then actuates electrical water-pump 37 by means of switch 38, mounted on exterior wall 57 or at any other position desired on the vehicle or trailer. When the user is finished the exact opposite of the above procedure is followed, rod 87 and curtain 53 are again folded and inserted within casing 45 and cover 47 may be replaced, all elements fitting within chamber 45. The modification shown in FIG. 6 is operated as described above with the exception that the entire assembly 41a may be removed from mounting brackets 125, if so desired.

Although the foregoing invention has been described in some detail, by way of illustration and example for purposes of clarity and understanding, it is understood that certain changes and modifications may be practiced within the spirit of the invention and scope of the appended claims.

What is claimed is:

1. In combination, a camper body having a wall, a casing recessed into said wall and opening exteriorly of said body, a cover hinged to the top of said casing covering the open front of said casing, shower nozzle means within said casing, said nozzle means connected to a source of water, and shower curtain support means capable of being stored within said casing, said support means adapted to be projected outwardly from said casing to support said curtain, said nozzle means comprising a nozzle head, a first pipe affixed to said head, a second pipe affixed to said wall of said mobile unit, a flexible coupling pipe between said first pipe and said second pipe.

2. A shower unit according to claim 1 in which said shower curtain support means comprises first and second horizontal curtain rods hingedly affixed within said casing to rotate from a first position entirely within said casing to a second position extending outwardly substantially at a right angle to said casing, and a third curtain rod adapted to be removably affixed between said first and second rods when in said second position.

3. A shower unit according to claim 1 in which said first pipe is slidably held by a bracket on the interior wall of said cover, said pipe sliding within said bracket as said cover is opened and closed.

4. In combination, a shower unit according to claim 1 and a mobile water heating system having a water cooled engine, a water tank, containing water to be heated, a heat transfer unit within said tank, connection means to said engine to bring coolant water heated by said engine through said heat transfer unit and back to the radiator of said engine, and hot water outlet means to carry hot water from said water tank to the exterior of said water tank and thence to said shower nozzle.

References Cited

UNITED STATES PATENTS

| | | | |
|---|---|---|---|
| 873,811 | 12/1907 | Walstrom | 4—147 |
| 1,330,312 | 2/1920 | Figueroa | 4—154 |
| 1,372,598 | 3/1921 | Buka | 4—151 |
| 1,647,643 | 11/1927 | Lehnert | 4—154 |
| 1,833,067 | 11/1931 | Caesar | 126—195 |
| 1,844,038 | 2/1932 | Hooker | 4—151 |
| 1,846,631 | 2/1932 | Cunningham | 4—149 |
| 2,004,151 | 6/1935 | Angstman | 237—123 |
| 2,005,196 | 6/1935 | Mears | 4—154 |
| 2,826,785 | 3/1958 | McCanless | 296—23 |
| 2,852,784 | 9/1958 | Winkler | 4—151 |
| 2,894,265 | 7/1959 | Reardon | 4—147 |
| 3,067,434 | 12/1962 | Neal et al. | 4—147 |
| 3,276,634 | 10/1966 | Arnot | 237—123 |

FOREIGN PATENTS

| | | |
|---|---|---|
| 1,100,022 | 3/1955 | France. |

LAVERNE D. GEIGER, *Primary Examiner.*

D. MASSENBERG, *Assistant Examiner.*